US008818718B2

(12) United States Patent
Garin

(10) Patent No.: US 8,818,718 B2
(45) Date of Patent: Aug. 26, 2014

(54) PND REPOSITIONING DETECTOR FOR BETTER NAVIGATION ACCURACY IN A CAR

(75) Inventor: Lionel J. Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 12/848,807

(22) Filed: Aug. 2, 2010

(65) Prior Publication Data

US 2012/0029811 A1 Feb. 2, 2012

(51) Int. Cl.
G06F 19/00 (2011.01)
G01C 21/20 (2006.01)
G01C 17/38 (2006.01)

(52) U.S. Cl.
CPC ............... *G01C 21/20* (2013.01); *G01C 17/38* (2013.01)
USPC .......................................................... 701/449

(58) Field of Classification Search
USPC ........ 701/33.1, 444, 445, 449, 472, 473, 500; 505/162; 342/350, 357.3, 357.32
See application file for complete search history.

(56) References Cited

U.S. PATENT DOCUMENTS

| 8,275,544 B1* | 9/2012 | Wells et al. ................. 701/501 |
| 2004/0204840 A1 | 10/2004 | Hashima et al. |
| 2007/0132894 A1* | 6/2007 | Vitito ............................ 348/837 |
| 2009/0115656 A1 | 5/2009 | Raman et al. |
| 2010/0030471 A1 | 2/2010 | Watanabe et al. |
| 2010/0141483 A1* | 6/2010 | Thacher et al. ............... 340/989 |

FOREIGN PATENT DOCUMENTS

| EP | 1950093 A1 | 7/2008 |
| JP | H03154819 A | 7/1991 |
| JP | 2003166848 A | 6/2003 |
| JP | 03594011 B2 | 11/2004 |
| JP | 2009139227 A | 6/2009 |
| JP | 2009281967 A | 12/2009 |
| WO | WO2009006341 A1 | 1/2009 |

OTHER PUBLICATIONS

International Search Report and Written Opinion—PCT/US2011/046001, ISA/EPO—Oct. 21, 2011.

* cited by examiner

*Primary Examiner* — Mary Cheung
(74) *Attorney, Agent, or Firm* — Shyam K. Parekh; Michael Johnson

(57) ABSTRACT

An apparatus and method for a personal navigation apparatus comprising a personal navigation device (PND) for providing navigational guidance information. The PND may include a single-dimensional magnetic detector for sensing magnetic flux amplitudes of a magnetic field generated by a magnet. Alternatively, the PND may include a three-dimensional magnetic detector and a magnetic calibration module for determining an ambient magnetic field calibration value representing immediate surroundings of the PND.

24 Claims, 12 Drawing Sheets

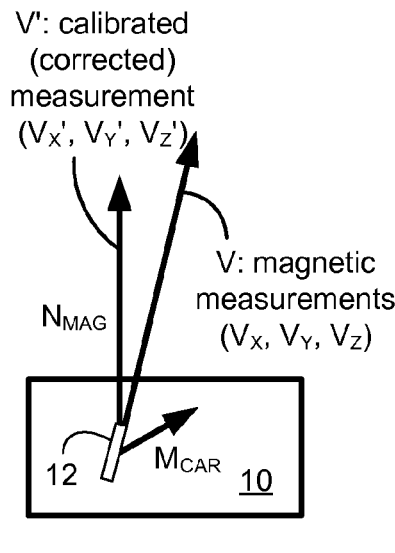 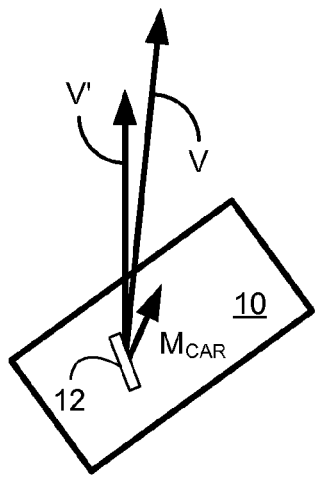 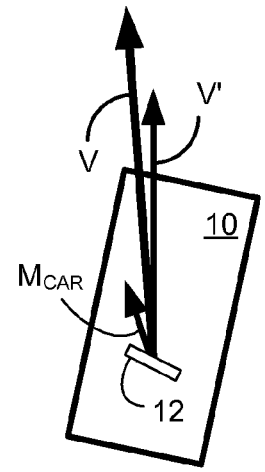
FIG. 11A  FIG. 11B  FIG. 11C
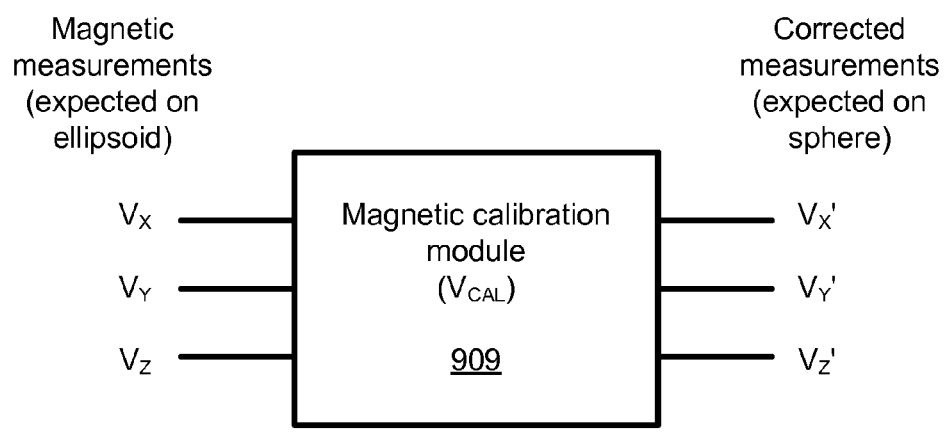
FIG. 12

US 8,818,718 B2

PND REPOSITIONING DETECTOR FOR BETTER NAVIGATION ACCURACY IN A CAR

RELATED APPLICATIONS

Not applicable

FIELD

This disclosure relates generally to apparatus and methods for providing in-vehicle navigational guidance. More particularly, the disclosure relates to a personal navigation device (PND) and methods of use for improved detection of an un-calibrated in-vehicle reference frame such that more accurate and real-time navigational information may be provided for guiding a moving vehicle from its current location to a destination.

BACKGROUND

Devices for in-vehicle navigational guidance to assist a driver traveling by vehicle from a current location of the vehicle to a desired destination have become an essential feature in modern vehicles. Such devices eliminate the burden of pre-planning or manual mapping of a driving route from a starting location to a desired destination. For example, U.S. Publ. 2010/0030471 (titled "Position detecting apparatus and method used in navigation system" to Watanabe et al. and published on Feb. 4, 2010, incorporated by reference herein) describes a position detecting apparatus, used in a navigation system for detecting a vehicle position, including an acceleration sensor, an angular velocity sensor and a dead reckoning calculating unit. Also see U.S. Publ. 2009/0115656 (titled "Systems and Methods for Global Differential Positioning" to Raman and Garin and published on May 7, 2009, incorporated by reference herein), which shows a device having micro-electromechanical system (MEMS) sensors, such as accelerometers and gyroscopes. The apparatus may be used as part of an in-vehicle navigational system to guide driving of a vehicle from a starting location to a desired destination. If not fixed to the vehicle, dead reckoning based on acceleration and angular velocity sensor measurements may become unreliable each time the apparatus moves in relation to the vehicle. Once moved, the dead reckoning calculations are based on sensor measurements from an unknown reference system.

The present disclosure provides aspects of improved apparatus and methods of accurate real-time navigational guidance for driving a vehicle from a current location to a desired destination and for detecting when sensor measurements become un-calibrated due to movement of the apparatus with respect to the vehicle.

SUMMARY OF THE DISCLOSURE

Disclosed is an apparatus and method for detection of an un-calibrated in-vehicle reference frame such that real-time inaccurate navigational information is not used when guiding a moving vehicle.

According to some aspects, disclosed is an in-vehicle personal navigation apparatus, wherein the apparatus comprises a personal navigation device (PND) for providing navigational guidance information to a driver for driving a vehicle from its current location to a desired destination. The PND may include an interface to movably couple the PND to a mount structure, wherein the mount structure includes a magnet to generate a magnetic field. The PND may also include a processor to provide navigation data and an inertial sensor that is coupled to the processor, wherein the inertial sensor generates inertial sensor measurements to the processor. The PND may further include a magnetic sensor that is coupled to processor and is positioned in the PND to sense the magnetic field generated by the magnet in the mount structure, wherein the magnetic sensor provides magnetic sensor measurements to the processor.

According to some aspects, disclosed is a method for reacting to a relative reorientation between a personal navigation device (PND) and a mount structure. The method may include coupling the PND to the mount structure, receiving initial magnetic sensor measurements of a magnetic field from the mount structure, and generating a reference value based on initial magnetic sensor measurements. The method may also include receiving inertial sensor measurements, computing navigation data based on the inertial sensor measurements. The method may further include reorienting the PND relative to the mount structure, receiving additional magnetic sensor measurements, detecting a difference between a value based on the additional magnetic sensor measurements and the reference value, and triggering an action in the PND based on the difference.

According to some aspects, disclosed is an in-vehicle personal navigation apparatus, wherein the apparatus comprises a personal navigation device (PND) for providing navigational guidance information to a driver for driving a vehicle from its current location to a desired destination. The PND may include means for coupling the PND to a mount structure, means for receiving initial magnetic sensor measurements of a magnetic field from the mount structure, and means for generating a reference value based on initial magnetic sensor measurements. The PND may also include means for receiving inertial sensor measurements, means for computing navigation data based on the inertial sensor measurements. The method may further include means for receiving additional magnetic sensor measurements, means for detecting a difference between a value based on the additional magnetic sensor measurements and the reference value, and means for triggering an action in the PND based on the difference.

According to some aspects, disclosed is computer-readable medium including program code stored thereon for an in-vehicle personal navigation comprising a personal navigation device (PND), the program code comprising program code for receiving initial magnetic sensor measurements of a magnetic field from the mount structure, and program code for generating a reference value based on initial magnetic sensor measurements. The program code may also include program code for receiving inertial sensor measurements, program code for computing navigation data based on the inertial sensor measurements. The program code may further include program code for reorienting the PND relative to the mount structure, program code for receiving additional magnetic sensor measurements, program code for detecting a difference between a value based on the additional magnetic sensor measurements and the reference value, and program code for triggering an action in the PND based on the difference.

According to some aspects, disclosed is a personal navigation device (PND) for in-vehicle personal navigation comprising a processor and memory, wherein the memory comprises program code for receiving initial magnetic sensor measurements of a magnetic field from the mount structure, and program code for generating a reference value based on initial magnetic sensor measurements. The program code may also include program code for receiving inertial sensor measurements, program code for computing navigation data based on the inertial sensor measurements. The program code may further include program code for reorienting the PND relative to the mount structure, program code for receiving additional magnetic sensor measurements, program code for detecting a difference between a value based on the additional magnetic sensor measurements and the reference value, and program code for triggering an action in the PND based on the difference.

According to some aspects, disclosed is a personal navigation device (PND) for providing navigational guidance information to a driver for driving a vehicle from its current location to a desired destination. The PND may include a three-dimensional magnetic sensor to generate magnetic sensor measurements. The PND may also include a magnetic calibration module, coupled to the three-dimensional magnetic sensor, comprising a distant magnetic field value representing Earth's magnetic dipole and based on the magnetic sensor measurement, and an ambient magnetic field value representing immediate surroundings of the PND and based on the magnetic sensor measurements. The PND may further include an inertial sensor to generate inertial sensor measurements and an inertial calibration module coupled to the inertial sensor and coupled to receive the ambient magnetic field value from the magnetic calibration module. The inertia calibration module comprises a recalibration output signal based on a change in the ambient magnetic field value, and a navigation module coupled to the inertial sensor and comprising navigation output data based on the inertial sensor measurements.

According to some aspects, disclosed is a method for computing navigation data in a personal navigation device (PND), the method includes generating three-dimensional magnetic sensor measurements, determining a distant magnetic field value representing Earth's magnetic dipole based on the magnetic sensor measurements and determining an ambient magnetic field calibration value representing immediate surroundings of the PND based on the magnetic sensor measurements. The method may also include generating inertial sensor measurements, and computing navigation output data based on the inertial sensor measurements. The method may further include reorienting the PND with respect to its immediate surroundings, determining a difference between an updated ambient magnetic field value and the ambient magnetic field calibration value, and computing navigation output data without the inertial sensor measurements based on the difference.

According to some aspects, disclosed is a method in a personal navigation device (PND), the method comprising: generating three-dimensional magnetic sensor measurements; determining a translation matrix to convert ellipsoid magnetic sensor measurements to spherical calibrated magnetic sensor measurements; determining a reference value from a magnitude of the calibrated magnetic sensor measurements; generating inertial sensor measurements; computing navigation output data based on the inertial sensor measurements; comparing a magnitude of the calibrated magnetic sensor measurements to the reference value to set a comparison result; and computing navigation output data without the inertial sensor measurements based on the comparison result.

According to some aspects, disclosed is a method in a personal navigation device (PND), the method comprising: generating three-dimensional magnetic sensor measurements; determining a reference ellipsoid from a magnitude of the calibrated magnetic sensor measurements; generating inertial sensor measurements; comparing a magnitude of the magnetic sensor measurements to the reference ellipsoid to set a comparison result; and computing navigation output data without the inertial sensor measurements based on the comparison result.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIGS. 11A, 11B and 11C illustrate magnetic field vectors with respect to a vehicle, in accordance with some embodiments of the present invention.

FIG. 12 illustrates a calibration module for calibrating sensed magnetic field values, in accordance with some embodiments of the present invention.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

An in-vehicle personal navigation devices (PND) may be fixedly attached or incorporated to the dashboard, windshield, or front panel of the vehicle. Such fixed PNDs provide navigational information to the driver of the vehicle for driving the vehicle from a current location to a desired destination. As an added convenience to the occupants of the vehicle, an in-vehicle PND may be movably mounted to the vehicle or even detachable from the vehicle. The driver or passenger of the vehicle may adjust the position of the PND to obtain a better view of the display on the PND or to view the navigational information more clearly. Unfortunately, once rotated, a PND may no longer generate accelerometer and gyrometer sensor measurements with respect to a known orientation. That is, these sensor measurements will be uncorrelated to the previously determined reference frame of the PND.

Figure 1A:
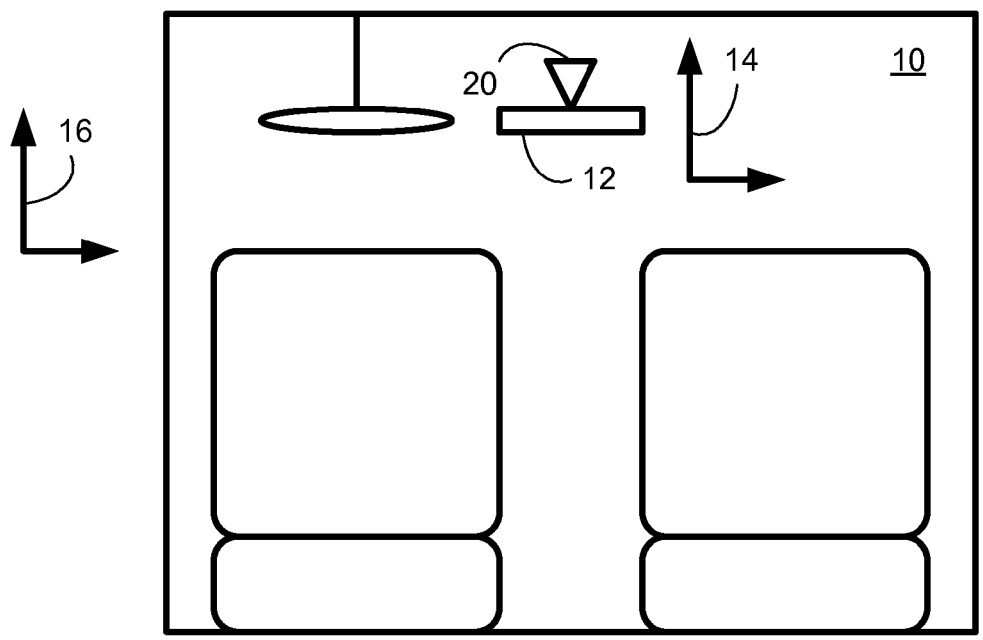
FIGS. 1A, 1B and 1C illustrate a reference frame of a vehicle and a reference frame of an in-vehicle personal navigation device, in accordance with some embodiments of the present invention.
Figure 1B:
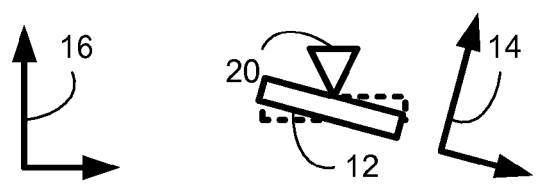
Figure 1C:
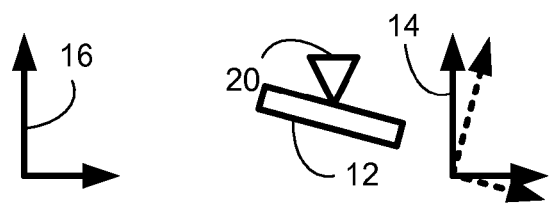

FIGS. 1A, 1B and 1C illustrate a reference frame 16 of a vehicle 10 and a reference frame 14 of an in-vehicle personal navigation device (PND 12), in accordance with some embodiments of the present invention. In FIG. 1A, a vehicle 10 includes a PND 12, which is movably mounted to the vehicle 10 on a mount structure 20. Together, the PND 12 and mount structure 20 from a personal navigation apparatus found in many vehicles. In an initial condition, the reference frame 14 of the PND 12 may be aligned with the reference frame 16 of the vehicle 10, such that navigational information or directions is accurately shown on the display of the PND 12. For example, when the vehicle undergoes forward acceleration, the PND 12 also undergoes forward acceleration.

In FIG. 1B, the position of the PND 12 may be adjusted by the driver of the vehicle 10 to get a better view of the display of the PND 12. As the PND 12 is rotated relative to the vehicle 10, the reference frame 14 is also moved along with the displacement of the PND 12. As a result, the reference frame 14 will not be aligned with the reference frame 16 of the vehicle 10. Any dead-reckoning based navigational directions provided by the PND 12 based on the misaligned reference frame 14 will be unusable and may cause incorrect information to be displayed, which may cause the driver to deviate from an intended driving route.

In FIG. 1C, the problem is solved by the PND 12 recognizing that the reference frame 14 is misaligned. Typically, the PND 12 recognizes this misalignment by comparing inertia measurements to GPS measurements or by receiving a recalibrate or reset command from the driver. Once the PND 12 recognizes its reference frame 14 is misaligned, the PND 12 performs a recalibration operation to realign its reference frame 14 to the reference frame 16 of the vehicle 10. After recalibrated, position changes determined based on dead reckoning (based on accelerometer and/or gyrometer sensor measurements) will be usable again.

Figure 2:
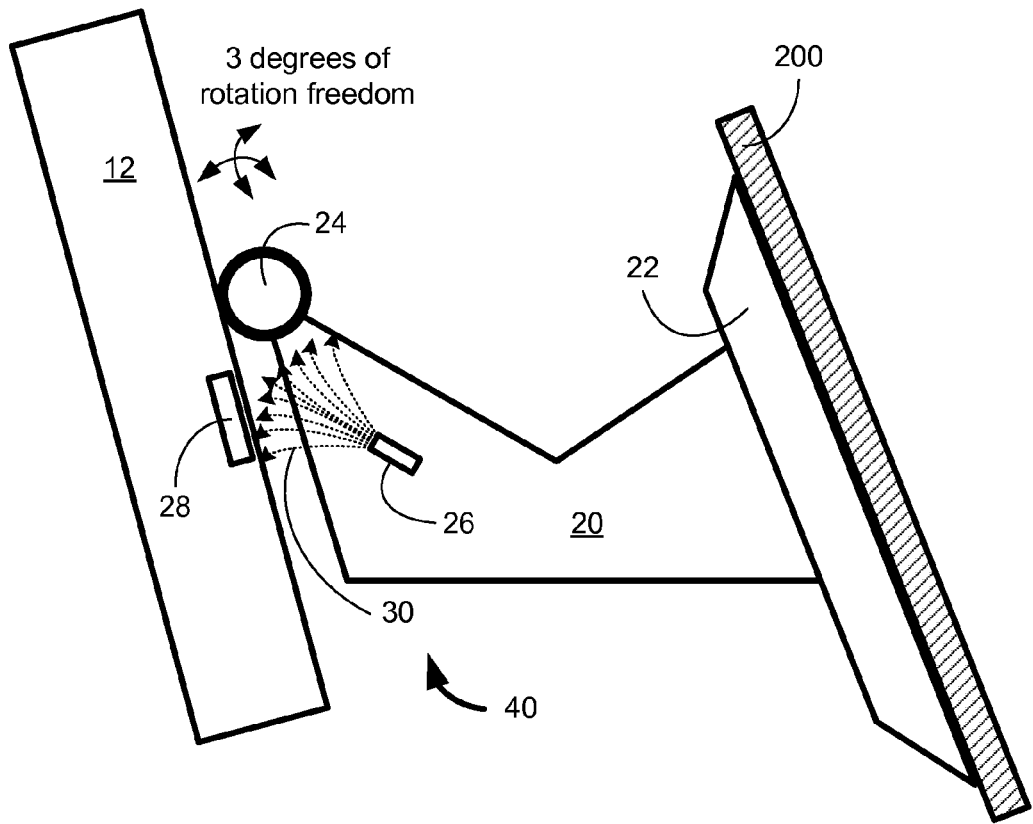
FIG. 2 illustrates an in-vehicle personal navigation apparatus, in accordance with some embodiments of the present invention.

FIG. 2 illustrates an in-vehicle personal navigation apparatus 40, in accordance with some embodiments of the present invention. The in-vehicle personal navigation apparatus 40 includes the PND 12 and mount structure 20. The PND 12 includes an interface to movably couple the PND 12 to the mount structure 20. This interface acts as a means for coupling the PND 12 to a mount structure 20. The mount structure 20 includes a magnet 26 that generates a magnetic field 30 and a surface interface element 22 for coupling the mount structure 20 to a surface 200 of the vehicle 10. The surface interface element 22 may be a suction cup or glue or the like that allows the surface interface element 22 to adhere to the surface 200. The surface 200 may be part of the vehicle's dashboard or windshield.

The mount structure 20 also includes a complementary interface element to rotatable coupling with the interface element of the PND 12. The interface element of the PND 12 and the complementary interface element of the mount structure 20 (e.g., a ball and socket combination) may be coupled to form a rotatable connection 24 with one, two or three degrees of rotational freedom. The mount structure 20 may also allow for translational movements of the PND 12. In one example, the rotatable connection 24 may also include a feature (e.g., a translation guide) to allow the PND 12 to be translated along one or more axes. In another example, the mount structure 20 may be constructed of an elastic and deformable material, such that the mount structure 20 may be manipulated to allow the PND 12 to be translated in various directions.

The PND 12 also includes a magnetic sensor 28 for detecting magnetic field or magnetic flux intensities. In this example, the mount structure 20 includes a magnet 26 and the PND 12 includes a magnetic sensor 28. In an alternative embodiment, the mount structure 20 may include the magnetic detector 20, while the PND 12 may include the magnet 26.

Figure 3:
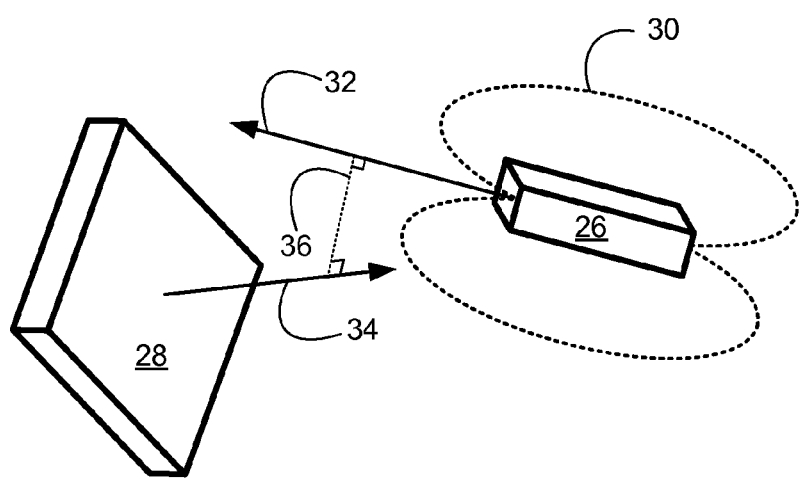
FIG. 3 illustrates a relative orientation of a magnetic detector and a magnet of an in-vehicle personal navigation apparatus, in accordance with some embodiments of the present invention.

FIG. 3 illustrates the relative orientation of a magnetic detector 28 and a magnet 26 of an in-vehicle personal navigation apparatus 40, in accordance with some embodiments of the present invention. The magnetic sensor 28 and the magnet 26 may be mounted in the PND 12 and mount structure 20 such that a magnetic sensitivity axis 34 of the magnetic sensor 28 and the magnetic moment 32 of the magnet 26 are skewed from one another. That is, the magnetic sensitivity axis 34 and the magnetic moment 32 are non-perpendicular, non-parallel, and non-intersecting for the range of rotational freedom between the PND 12 and the mount structure 20.

For example, the magnetic sensitivity axis 34 of the magnetic detector 28 may be oriented at a relative offset 36 to the magnetic moment 32 of the magnet 26. The relative offset 36 defined as the shortest line between (or equivalently, the closest points) of two lines: an imaginary line extending from the magnetic sensitivity axis 34 and an imaginary line extending from the magnetic moment 32. The relative offset 36 may be comprised of space or distance offset and angular offset. For instance, the magnetic sensitivity axis 34 may be spaced apart from the magnetic moment 32 to from a relative offset 36 of 3 millimeters (mm) to 9mm. In one embodiment, the magnetic sensitivity axis 34 may be spaced apart from the magnetic moment 32 by approximately 6 mm. The magnetic sensitivity axis 34 may be located at about 9 mm from the rotatable connection 24 and the magnetic moment 32 may be located at about 3 mm from the rotatable connection 24. In addition, the angular offset between the magnetic sensitivity axis 34 and the magnetic moment 32 may define an angle of 1-14 degrees on a horizontal axis and 1-20 degrees on a vertical axis. In one embodiment, the angular offset is 7 degrees on the horizontal axis and 10 degrees on the vertical axis.

In some embodiments, the rotatable connection 24 maintains the skewed (non-perpendicular, non-parallel, and non-intersecting) orientation between magnetic sensitivity axis 34 of the magnetic sensor 28 and the magnetic moment 32 of the magnet 26. As the position of the PND 12 is adjusted (e.g., rotated and/or translated), the magnetic sensitivity axis 34 of the magnetic sensor 28 sweeps across the magnetic flux lines of the magnetic field 30 produced by the magnet 26. Movement of the PND 12 may cause the magnetic sensor 28 to be positioned either closer or farther away from the magnet 26. Similarly, the movement of the PND 12 may cause the angle between magnetic moment axis and magnetic sensitivity axis to vary, thus modifying the response of the magnetic sensor 28. As such, the magnetic sensor 28 detects either increasing or decreasing magnetic flux amplitudes of the magnetic field 30 of the magnet 26 as the PND 12 is moved. In some embodiments, the magnetic sensor 28 detects either increasing or decreasing monotonic changes in the magnetic flux amplitude of the magnetic field 30 as the PND 12 is rotated about a single axis due to the relative offset orientation of magnetic sensor 28 and the magnet 26.

Figure 4:
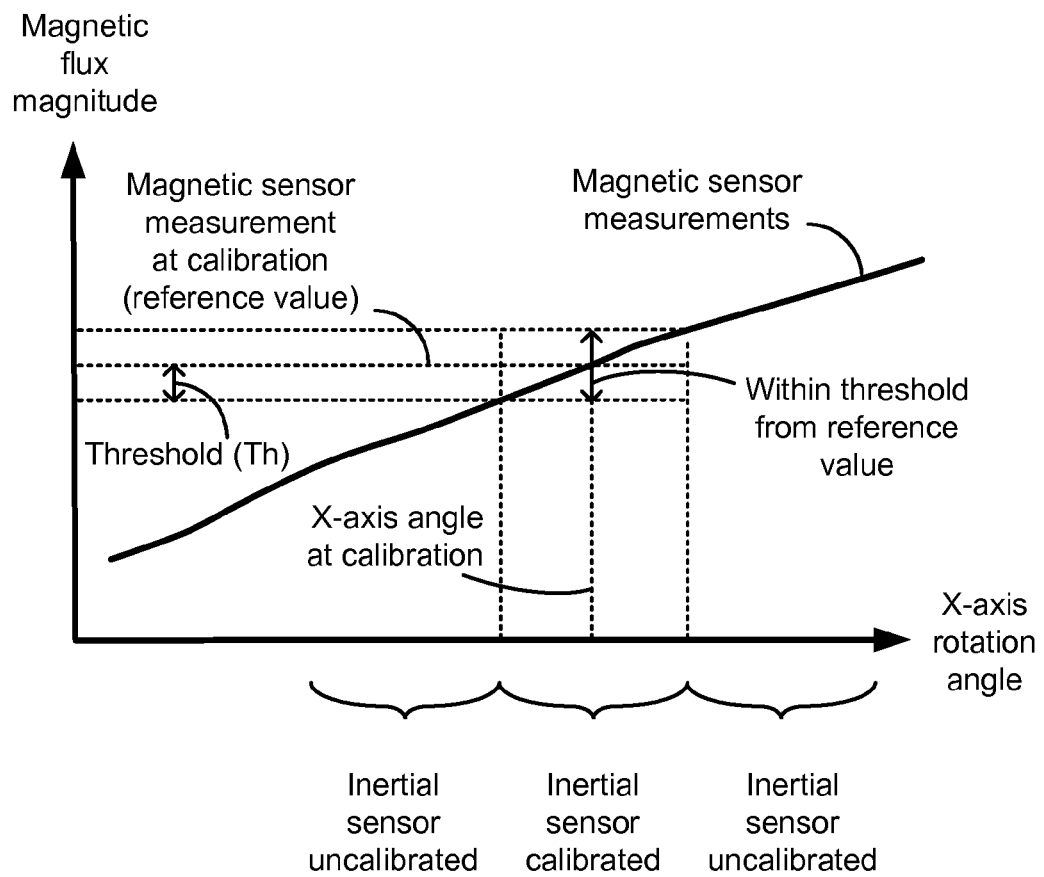
FIG. 4 illustrates a graphical plot of magnetic response versus rotation angles, in accordance with some embodiments of the present invention.

FIG. 4 illustrates a graphical plot of magnetic response versus rotation angles, in accordance with some embodiments of the present invention. Over a single axis of motion, flux measurements monotonically change as detected by the magnetic sensor 28 as the PND 12 is rotated about an X-axis with reference to the mount structure 20. The horizontal axis represents the angular rotation of the PND 12 about the X-axis of the mount structure and the vertical axis represents the amplitude of the magnetic flux in the magnetic field 30 detected by the magnetic sensor 28. In this hypothetical example, if the PND 12 is rotated about the X-axis in one direction, the magnetic flux amplitude increases. As the PND 12 is rotated about the X-axis in the opposite direction, the magnetic flux amplitude decreases. A monotonic response advantageously relates a significant movement of the PND 12 about an axis to a significant change in a magnetic measurement. If the response was non-monotonic, two distant angles could produce a similar magnetic measurement.

Once an inertial sensor is calibrated, the PND 12 records a current magnetic measurement (such as a magnetic flux magnitude value) and saves it as a reference value (Ref). During operation, the PND 12 compares magnetic sensor measurements to this reference value. If the PND 12 does not change position or only vibrates or move just an insignificant amount relative position to the mount structure 20, the magnetic measurement from the magnetic sensor 28 does not change more than an appreciable amount (e.g., less than a threshold Th). If the change of magnetic measurement exceeds a threshold (Th) away from the reference value (>Ref±Th), the position of the PND 12 has been moved enough relative to the mount structure 20 to make the inertial sensor measurements uncalibrated and recalibration of the reference frame 14 is required. While the references frame 14 is uncalibrated, accelerometer and gyrometer measurements will not be reliable enough for dead reckoning. Once recalibrated, a new magnetic sensor measurement is saved for future comparison as the reference value (Ref). As long as the detected change of magnetic amplitude does not exceed a threshold (Th) away from the updated reference value (Ref), the position of the PND 12 has not changed significantly enough to require recalibration of the reference frame 14 and the accelerometer and gyrometer measurements are still reliable for dead reckoning purposes.

Figure 5:
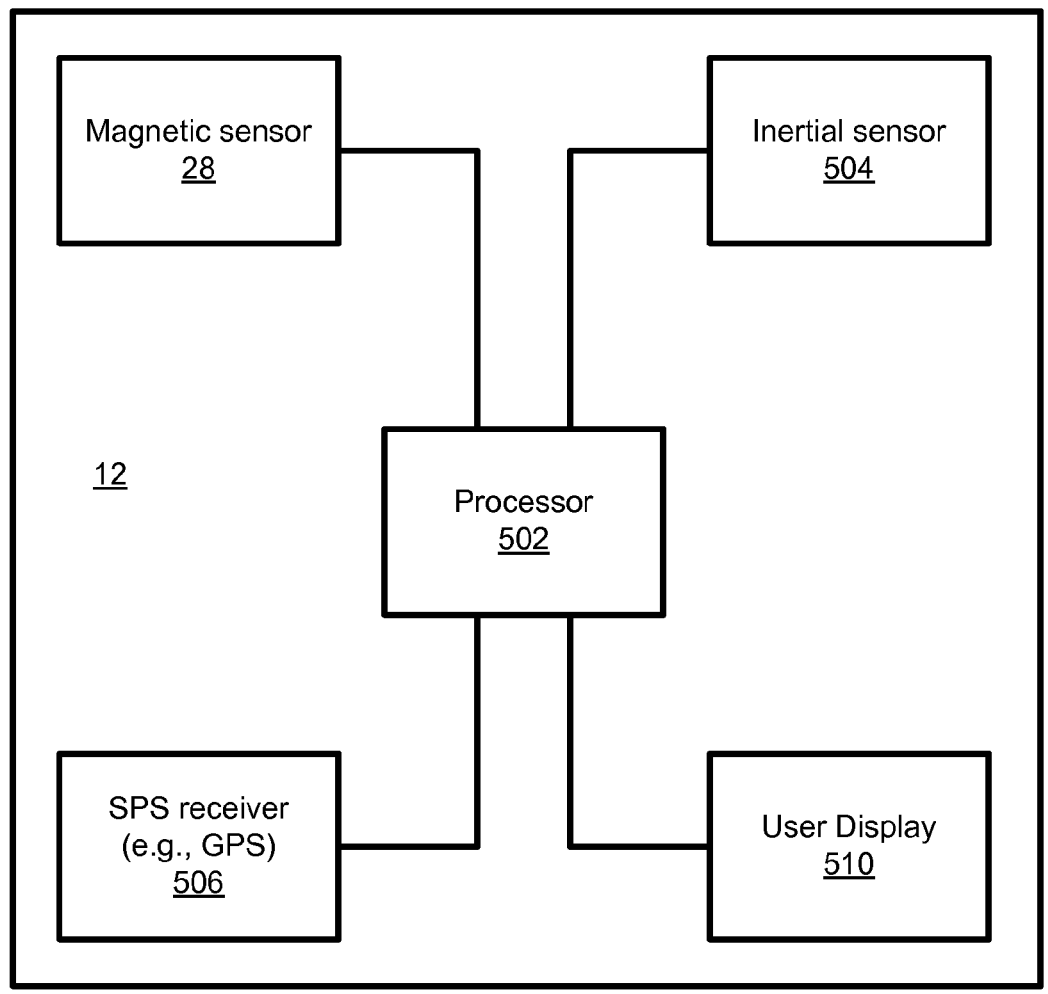
FIG. 5 illustrates a block diagram of various components of a personal navigation device, in accordance with some embodiments of the present invention.

FIG. 5 illustrates a block diagram of various components of a PND 12, in accordance with some embodiments of the present invention. The PND 12 includes a processor 502, an inertial sensor 504, a satellite navigation system (SPS) receiver 506, a magnetic sensor 28, and a user display 510. The processor 502 is coupled to the inertial sensor 504, the SPS receiver 506, the magnetic sensor 28, and the user display 510 via one or more buses and ports. The processor 502 may be a general purpose microcomputer or microcontroller or may be an application specific microcontroller. The processor 502 may contain internal memory and/or may be coupled to external memory. The user display 510 receives navigation data to display from the processor 502 and may include an LCD screen or the like.

The inertial sensor 504 provides inertia measurements to the processor 502, which the processor 502 may use during dead-reckoning navigation. For example, the inertia measurements include linear acceleration measurements from an accelerometer and/or angular acceleration measurements from a gyrometer. The accelerometer and gyrometer may each detect acceleration along a single axis (one dimension or 1-D), two axes (2-D) or alternatively three axes (3-D).

The SPS receiver 506 may receive any of a number of Global Navigation Satellite Systems (GNSS) including U.S. Global Positioning System (GPS), Russian GLONASS and the European Galileo systems. When no satellites (or pseudo-satellites) are not available, a navigation system may produce position updates using a dead-reckoning technique with inertial sensor measurements as an input. When an adequate number of satellites are not available, a navigation system may combine position estimates from SPS measurements and dead reckoning, or use dead reckoning alone.

The magnetic sensor 28 measures a magnetic field or magnetic flux intensity. In some embodiments, the magnetic sensor 28 is a single-dimension device. For example, the magnetic sensor 28 may be a single-axis (1-D) Hall-Effect detector. In other embodiments, the magnetic sensor 28 is a 2-D or 3-D device. The magnetic sensor 28 may be a magnetometer, which measures a magnetic field intensity, or an electronic compass, which measures a magnetic field intensity and direction.

Figure 6:
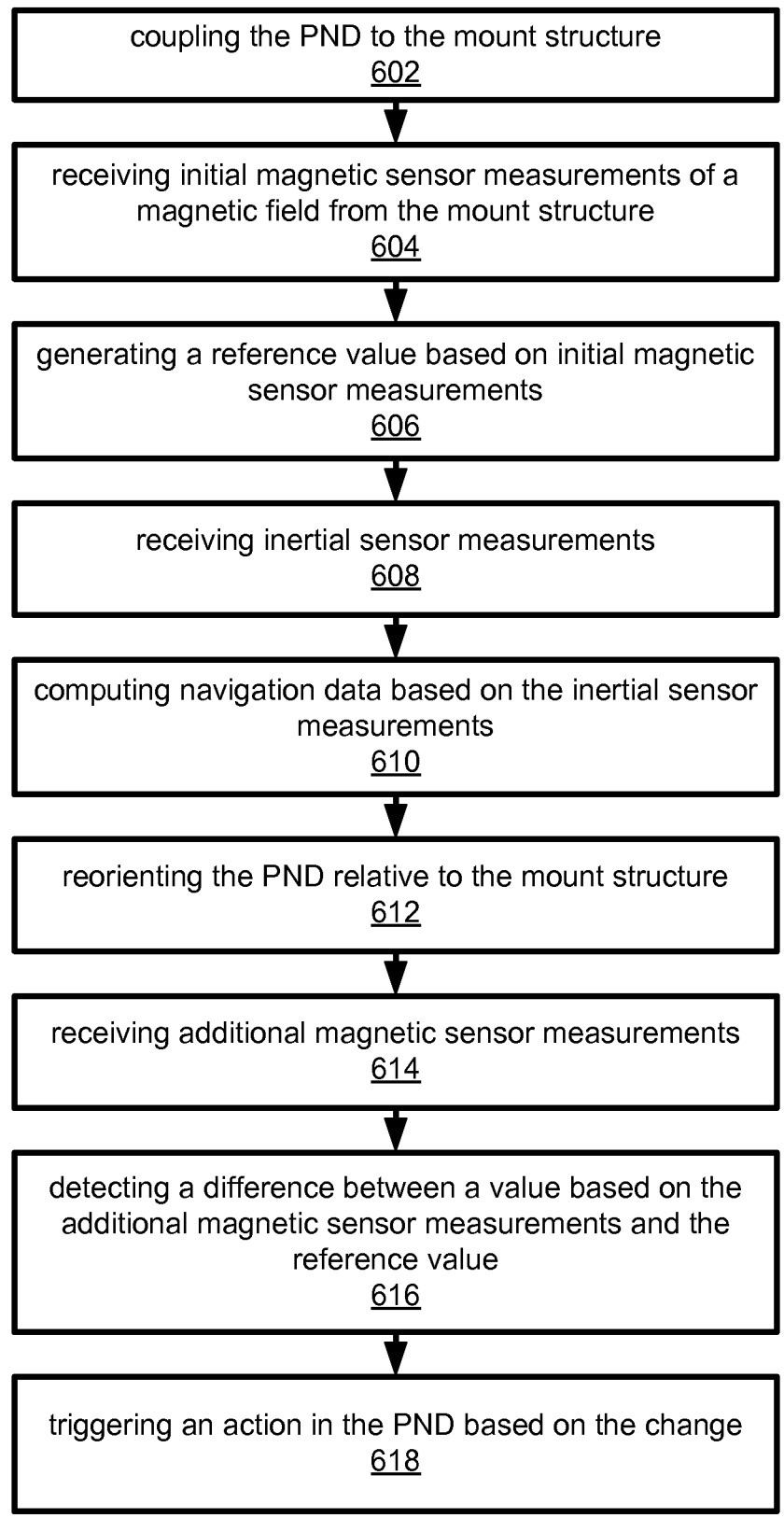
FIG. 6 illustrates a flowchart of a process for triggering an action to realign a reference frame of a personal navigation device, in accordance with some embodiments of the present invention.

FIG. 6 illustrates a flowchart of a process for triggering an action to realign a reference frame 14 of a PND 12, in accordance with some embodiments of the present invention. Once a misalignment is detected, the reference frame 14 of the PND 12 may be recalibrated to the reference frame 16 of a vehicle 10.

At 602, the PND 12 is coupled to a mount structure 20 attached to a vehicle 10. Once coupled, in some embodiments, the magnetic sensitivity axis 34 of the magnetic sensor 28 and the magnetic moment 32 of the magnet 26 are skewed from one another. For some embodiments, repositioning the PND 12 in the mount structure 20 across a full range of relative positions preserves this skewed property.

At 604, the magnetic sensor 28 measures a magnetic value (such as an absolute magnetic flux amplitude) of the magnetic field 30. This initial magnetic sensor measurement generated by the magnetic sensor 28 is received by the processor 502.

At 606, the processor 502 generates a reference value (Ref) based on the initial magnetic sensor measurement. The processor 502 may save this reference value (Ref) in internal and/or external memory. For example, the processor 502 saves the initial magnetic sensor measurement as the reference value (Ref). Alternatively, the processor 502 may compute and store an average of the initial magnetic sensor measurements as the reference value (Ref). Alternatively, the processor 502 may compute and store a square root of the sum of the initial magnetic sensor measurements as the reference value (Ref). Alternatively, the processor 502 may compute and store a sum of the initial magnetic sensor measurements as the reference value (Ref).

At 608, the processor 502 receives inertial sensor measurements from the inertial sensor 504 and aligns the reference frame 14 of the PND 12 onto the vehicle reference frame 16.

At 610, based on the inertial sensor measurements from the inertial sensor 504 and/or global positioning information received from the SPS receiver 506, the processor computes navigational guidance information and displays the information on the user display 510. If global positioning information alone is inadequate for accurate positioning, the processor 502 may compute a position estimate based at least in part on dead reckoning.

At 612, the PND 12 is physically adjusted or reoriented (relative to the vehicle 10) on the mount structure 20 by a user. At this point if moved enough, the inertial sensor measurements become uncalibrated with the reference frame 14 of the PND 12, thus are inadequate for dead-reckoning navigation.

At 614, the magnetic sensor 28 measures a new magnetic value, which is received by the processor 502 as an additional magnetic sensor measurement.

At 616, the processor 502 compares the additional magnetic sensor measurement (Meas) to the reference value (Ref). If this new magnetic sensor measurement (Meas) is within a threshold (Th) from the previously saved reference value (Ref), no action is taken. If this new magnetic sensor measurement (Meas) is greater or less than a threshold (Th) from the reference value (Ref) (i.e., if $\{|Meas|>(|Ref|+Th)\}$ or $\{|Meas|<(|Ref|-Th)\}$), then the PND 12 is declare to be uncalibrated.

At 618, if the PND 12 is uncalibrated based on the detected difference between the additional magnetic sensor measurements (Meas) and the reference value (Ref) being more than the threshold (Th), the processor 502 triggers one or more actions. The action may include invalidating measurements provided by the inertial sensor 504. The action may also include recalibrating the inertial sensor 504, a dead-reckoning algorithm, and/or a reference frame conversion matrix.

Figure 7:
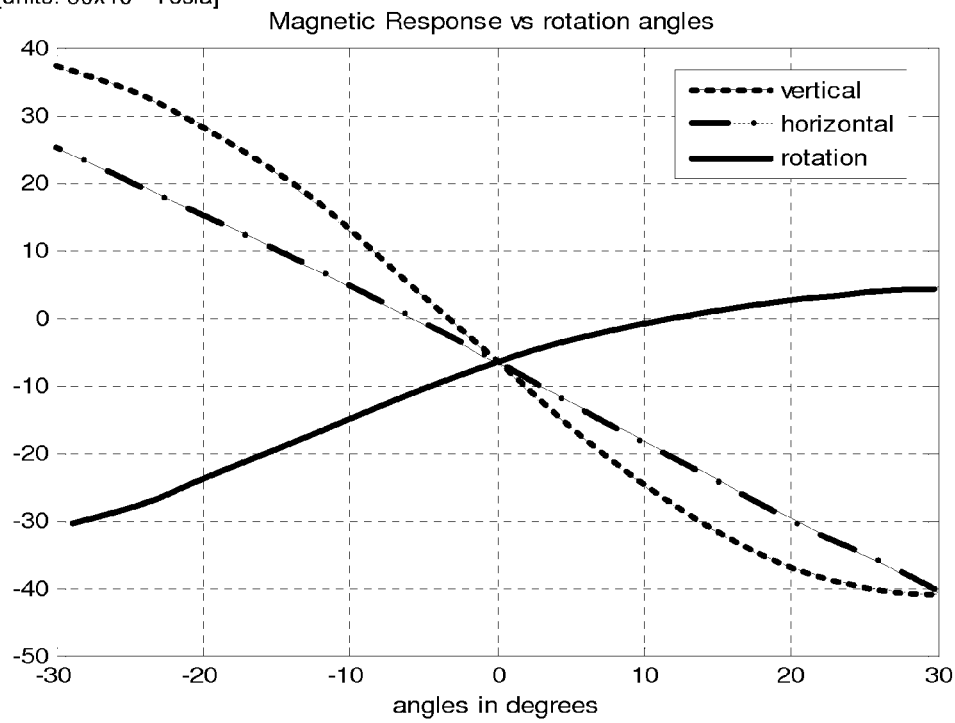
FIG. 7 illustrates a graphical plot of magnetic responses, in accordance with some embodiments of the present invention.
Figure 7:
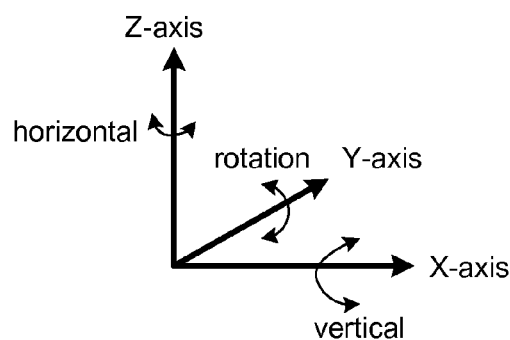

FIG. 7 illustrates a graphical plot of magnetic responses, in accordance with some embodiments of the present invention. The PND 12 is coupled to the mount structure 20 to allow one or more degrees of freedom. In this example, the coupling allows for three degrees of movement (e.g., horizontally about X, vertically about Y and rotationally about Z). Magnetic changes for vertical, horizontal, and rotation movements are respectively illustrated by the three curves on the graph. For each degree of movement, when isolated from other degrees of movement, the magnetic sensor 28 and the magnet 26 are positioned relative to one another such that the magnetic response is monotonic as the PND 12 rotated or moved along an access. As shown, increasing an angle about the horizontal axis (X) causes monotonically decreasing magnet measurements. Increasing an angle about the vertical axis (Y) also causes monotonically decreasing magnet measurements. Increasing an angle about the rotational axis (Z) cause monotonically increasing magnet measurements.

When moving the PND 12 about more than one axis, the measured magnetic value is the linear combination of the lines shown.

In the embodiments described above, the mount structure 20 includes a magnet 26. In these embodiments, a magnetic sensor 28 measures the magnetic field 30 generated by the magnet 26. In the embodiments described below, changes in a local magnetic field of the vehicle 10 are detected rather than the magnetic field 30 generated by a magnet 28. In essence, the vehicle itself produces the magnetic field 30 (rather than being produced by the separate magnet 28). The magnetic sensor 28 detects a magnetic field comprising a combination of: (1) the Earth's magnetic field; (2) the magnetic field induced by Earth's magnetic field on the metallic structure of the vehicle 10; and (3) the magnetic field generated by the body and electronics of the vehicle 10. The local or ambient magnetic field is a result of the latter two sources. The distant magnetic field is assumed to be the Earth's magnetic field.

Hypothetically, if the vehicle 10 is rotated in three dimensions, the measured magnetic field is distorted by the structure of the vehicle 10 and appears as an ellipsoid. A 3-D magnetic sensor 28 measures this magnetic field as amplitude, which represents various radii of the ellipsoid. In two dimensions, as a vehicle 10 may make a level 360 degree turn, the magnetic sensor measurements result in an ellipse when the amplitudes of the measurements are plotted verses the turning angle of the vehicle 10.

Figure 8:
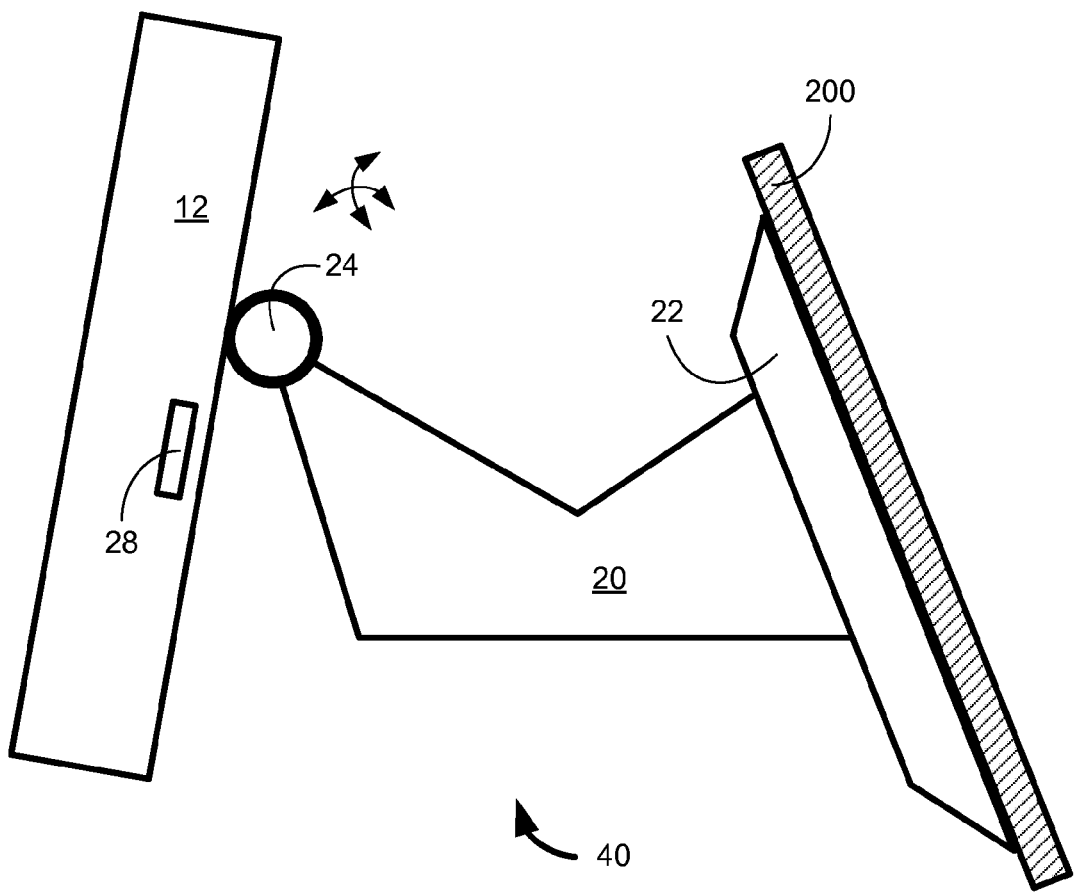
FIG. 8 illustrates an in-vehicle personal navigation apparatus, in accordance with some embodiments of the present invention.

FIG. 8 illustrates an in-vehicle personal navigation apparatus 40, in accordance with some embodiments of the present invention. In this embodiment, the vehicle 10 itself is used as a secondary magnet instead of using a separate magnet 26. This secondary magnetic field is the result of the Earth's magnetism induced on the vehicle 10 in combination with the magnetic properties inherent in the vehicle 10. The in-vehicle personal navigation apparatus 40 includes a PND 12 and a mount structure 20. The PND 12 includes a 3-dimensional (3-D) magnetic sensor 28 and a connector allowing it to couple to the mounting structure 20. The mounting structure 20 includes a complementary connector 24 and a surface interface element 22 for coupling the mount structure 20 to a surface 200 of the vehicle 10. By way of rotatable connection 24, the PND 12 may be movably coupled to the mount structure 20, which is coupled to a surface 200 of the vehicle.

Figure 9:
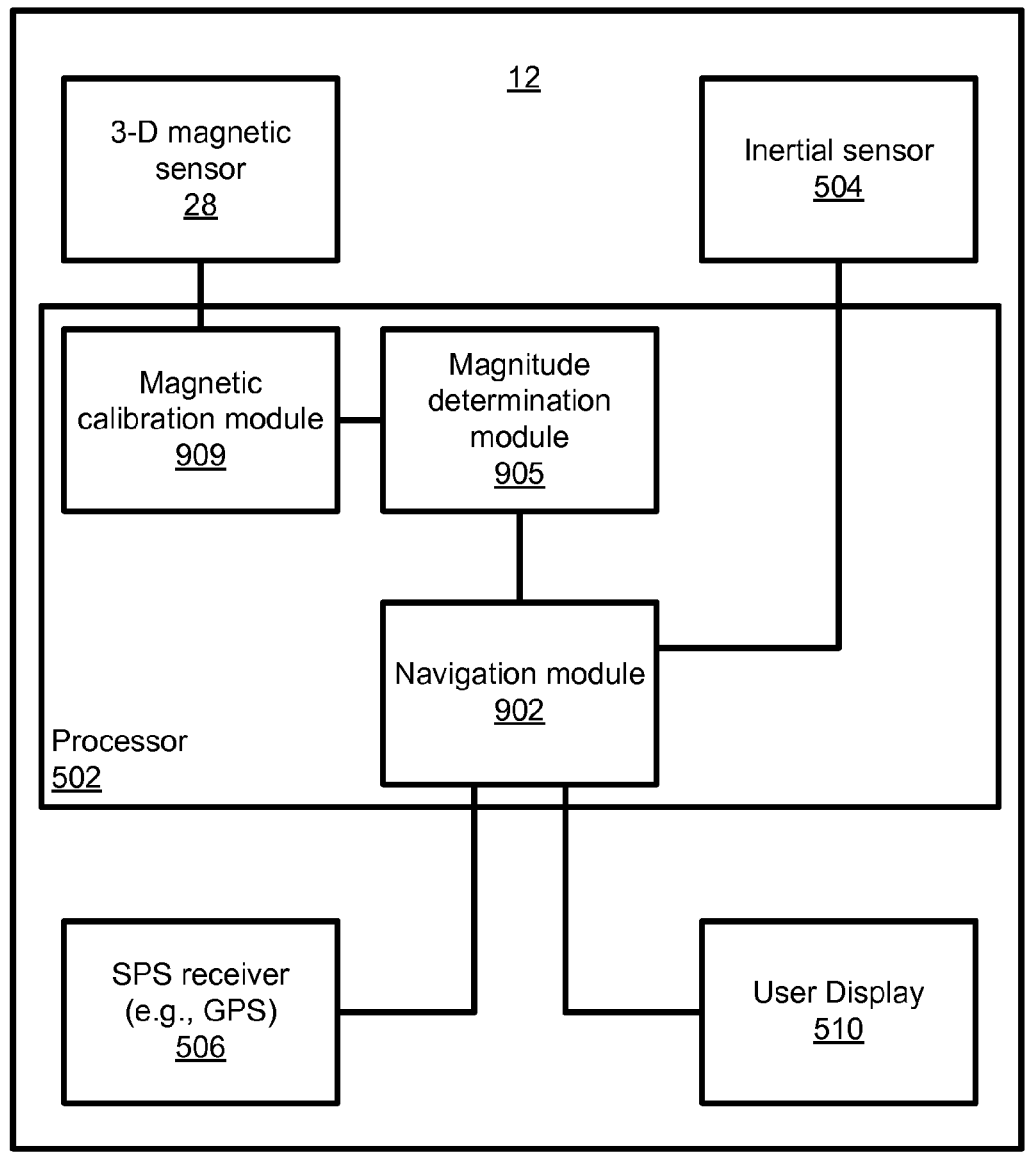
FIG. 9 illustrates a block diagram of various components of a personal navigation device, in accordance with some embodiments of the present invention.

FIG. 9 illustrates a block diagram of various components of a PND 12, in accordance with some embodiments of the present invention. The PND 12 includes three-dimensional (3-D) magnetic sensor 28, an inertial sensor 504, a satellite navigation system (SPS) receiver 506, a user display 510 and a processor 502. The processor 502 includes software modules including a navigation module 902, a magnitude determination module 905, and a magnetic calibration module 909. These modules may exist as separate software routines and/or together as in-line code. Unlike the PND 12 of FIG. 5, which may include a 1-D, 2-D or 3-D magnetic sensor 28, the magnetic sensor 28 here is a 3-D magnetic sensor.

The navigation module 902 receives satellite signal from the SPS receiver 506. The navigation module 902 also receives inertia measurements from the inertial sensor 504 for dead-reckoning navigation. When satellites (or pseudo-satellites) are available, a navigation module 902 may produce position updates using dead reckoning with inertial sensor measurements as an input. The navigation module 902 elaborates navigation information displayed to the user by display 510.

The magnetic calibration module 909 receives the magnetic sensor measurements from the 3-D magnetic sensor 28. As stated above, the measured magnetic field comprising a combination of three components: (1) the Earth's magnetic field; (2) the magnetic field induced by Earth's magnetic field on the metallic structure of the vehicle 10; and (3) the magnetic field generated by the body and electronics of the vehicle 10. The local or ambient magnetic field is a result of the latter two sources. The distant magnetic field is assumed to be the Earth's magnetic field. The magnetic calibration module 909 includes a translation matrix or the like to convert magnetic sensor measurements defining an ellipsoid to calibrated magnetic sensor measurements defining a sphere. The translation matrix removes the ambient magnetic field (components (2) and (3)) from the measured magnetic field to result in the Earth's magnetic field (component (3)). The magnetic sensor measurements multiply the magnetic field measurements and the translation matrix to result in the calibrated magnetic sensor measurements. If properly calibrated, the calibrated magnetic sensor sensor measurements have a constant magnitude and an orientation aligned with the unperturbed Earth magnetic field.

The magnitude module 905 monitors the calibrated magnetic sensor measurements. The magnitude module 905 may be coupled to the magnetic calibration module 909 to receive the calibrated magnetic sensor measurements. The magnitude module 905 may have a magnitude unit to determine a magnitude of the calibrated magnetic sensor measurements, and a comparator to produce a comparison result by comparing the determine magnitude with the reference magnitude in the memory.

As calibrated magnetic sensor measurements are received, the magnitude module 905 computes a magnitude (e.g., $\sqrt{x^2+y^2+z^2}$ or equivalently $(x^2+y^2+z^2)$ ignoring the square root). This computed magnitude is compared with a similarly computed magnitude (previously saved as a reference value (Ref) after calibration) to produce a comparison result. If the magnitude is within a threshold (Th) from the reference value (Ref), the calibrated magnetic sensor measurements still form a sphere and the comparison results indicates the inertial sensor measurements are still valid. On the other hand, if the magnitude is greater than the threshold (Th) from the reference value (Ref), the calibrated magnetic sensor measurements no longer define a sphere, therefore, the PND 12 is not properly calibrated (for example, because the PND 12 has been rotated relative to the vehicle 10) and the comparison results indicates the inertial sensor measurements have become invalid.

When the comparison result indicates the inertial sensor measurements are valid, the navigation module 902 may use inertial sensor measurements for dead reckoning. When the comparison result indicates the inertial sensor measurements are invalid, the navigation module 902 may inhibit the invalid inertial sensor measurements from adversely affecting the position estimate.

The processor 502 acts as a means for receiving initial magnetic sensor measurements of a magnetic field from the mount structure, for generating a reference value based on initial magnetic sensor measurements, for receiving inertial sensor measurements, for computing navigation data based on the inertial sensor measurements, for receiving additional magnetic sensor measurements, for detecting a difference between a value based on the additional magnetic sensor measurements and the reference value, and for triggering an action in the PND based on the difference.

Figure 10:
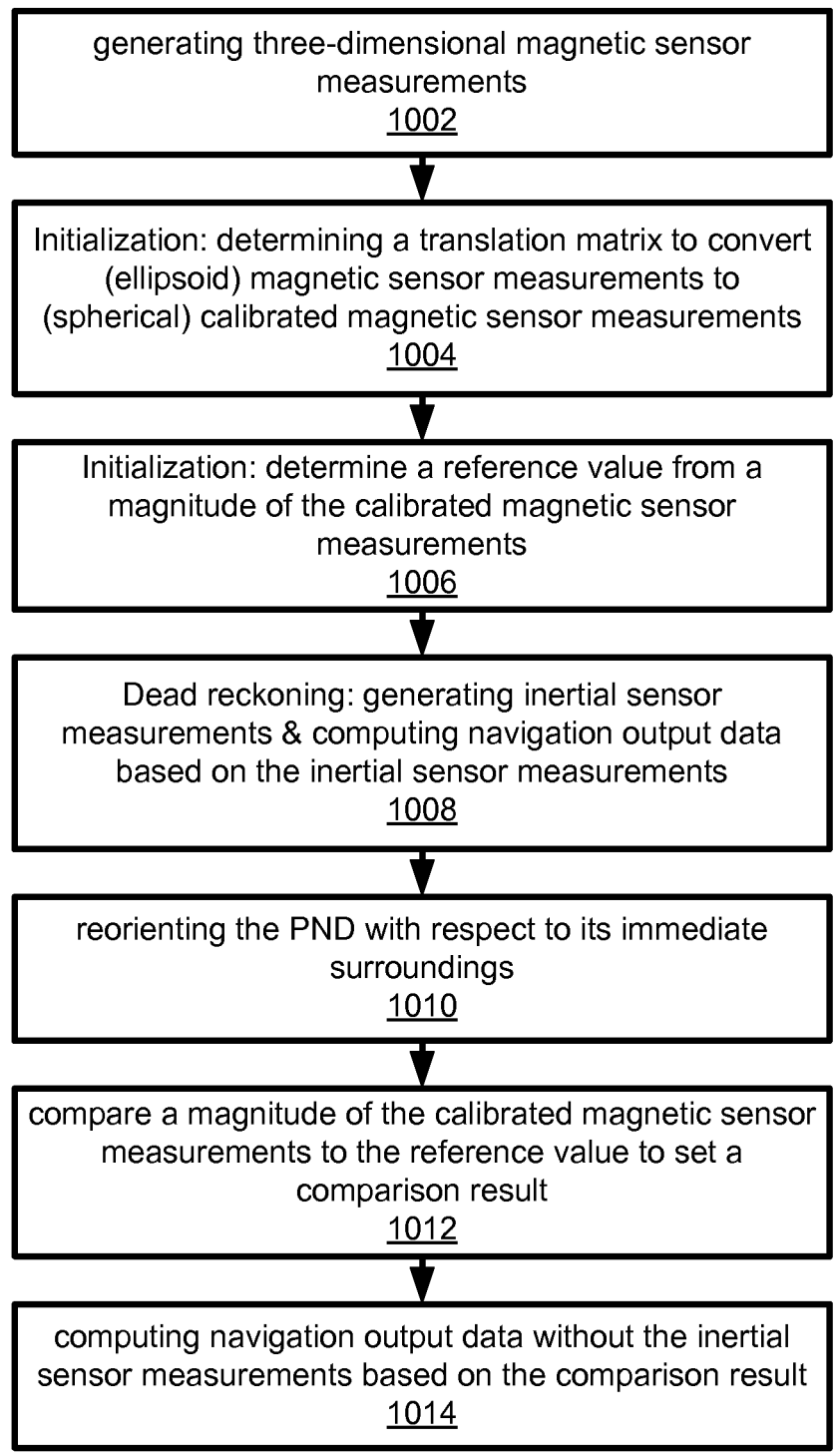
FIG. 10 illustrates a flowchart of a process for computing navigation guidance information before and after reorienting a personal navigation device, in accordance with some embodiments of the present invention.

For example, the magnetic calibration module 909 acts as a means for receiving initial magnetic sensor measurements of a magnetic field from the mount structure, for receiving inertial sensor measurements, and for receiving additional magnetic sensor measurements. The magnitude determination module 905 acts as a means for generating a reference value based on initial magnetic sensor measurements, for detecting a difference between a value based on the additional magnetic sensor measurements and the reference value, and means for triggering an action in the PND based on the difference. The navigation module 902 acts as a means for computing navigation data based on the inertial sensor measurements FIG. 10 illustrates a flowchart of a process for computing navigation guidance information before and after reorienting a PND 12, in accordance with some embodiments of the present invention. The calibrated navigation data is based on a calibrated reference frame 14 of the PND 12 that is aligned with the reference frame 16 of the vehicle 10.

At 1002, a 3-D magnetic detector 28 senses a surrounding magnetic field and generates three-dimensional magnetic sensor measurements. The magnetic sensor measurements represent a combination of: (1) the Earth's magnetic field; (2) the induced magnetic field; and (3) the generated magnetic field.

At 1004, the three-dimensional magnetic detector 28 sends the three-dimensional magnetic sensor measurements to the magnetic calibration module 909. During an initialization step, the magnetic calibration module 909 determines a translation matrix to remove the ambient magnetic field from the distant magnetic field value. Once initialized, the magnetic calibration module 909 translates the ellipsoidal 3-D magnetic sensor measurements into spherical 3-D magnetic sensor measurements using the translation matrix. That is, for each 3-D magnetic sensor measurement received, the magnetic calibration module 909 removes the ambient magnetic field resulting in a magnetic field pointing along magnetic north in three dimensions.

At 1006, the magnitude determination module 905 determines a reference value (Ref) from a magnitude of the calibrated magnetic sensor measurements. This reference value (Ref) is saved to memory for comparison with future calibrated magnetic sensor measurements.

At 1008, the inertial sensor 504 generates inertial sensor measurements, which it sends to the navigation module 902. At this point, assume a sufficient number of satellites is not available. Thus, the navigation module 902 computes navigation output data during a period based on the inertial sensor measurements (e.g., via dead reckoning).

At 1010, the user physically reorients the PND 12 with respect to the vehicle 10 during this dead-reckoning period.

At 1012, the magnitude determination module 905 compares a magnitude of the calibrated magnetic sensor measurements to the reference value (Ref) to set a comparison result. If the magnitude is within a threshold (Th) of the reference value (Ref), then the calibrated magnetic sensor measurements still form a sphere and the inertial sensor measurements are considered valid. If the magnitude is greater than a threshold (Th) from the reference value (Ref), then the calibrated magnetic sensor measurements no longer form a sphere and the inertial sensor measurements are considered invalid.

At 1014, the navigation module 902 triggers an action based on the comparison result. For example, the navigation module 902 may use the inertial sensor measurements for dead reckoning if the calibrated magnetic sensor measurements still form a sphere. If the comparison result indicates the inertial sensor measurements are invalid, then the navigation module 902 may stop using the inertial sensor measurements for dead reckoning and may begin to recalibrate the inertial sensor 504. The comparison result may then trigger recalibrating a dead-reckoning algorithm and recalibrating the translation matrix.

FIGS. 11A, 11B and 11C illustrate magnetic field vectors with respect to a vehicle 10, in accordance with some embodiments of the present invention. In FIG. 11A, a vehicle 10 includes a PND 12 to provide navigational guidance information for driving the vehicle 10 from its current location to a destination. In this example, the PND 12 includes a three-dimensional magnetic detector that detects the magnetic field intensities in the immediate surroundings and generates a magnetic field measurement which may be represented by a magnetic vector V ($V_X$, $V_Y$, $V_Z$) with a particular magnitude and orientation. The magnetic vector V may be a product of a magnetic vector $M_{CAR}$ of the vehicle 10 and a magnetic vector $N_{MAG}$ of the Earth's magnetic dipole. Accordingly, the magnitude and direction of vector V may be the sum of vector $M_{CAR}$ and vector $N_{MAG}$. In this example, as illustrated in FIG. 11A, the magnetic vector $M_{CAR}$ of the vehicle 10 is directed towards the rear left corner of the vehicle, and the magnetic vector $N_{MAG}$ of the Earth's magnetic dipole is directed towards the left of the vehicle 10. The vector V is a sum of vector $M_{CAR}$ and vector $N_{MAG}$ and directed at an direction or orientation that is the sum of vector $M_{CAR}$ and vector $N_{MAG}$.

In FIG. 11B, the orientation of the vehicle 10 may be changed, and the orientation of the magnetic vector $M_{CAR}$ of the vehicle 10 relative to the magnetic vector $N_{MAG}$ of the Earth's magnetic dipole will also accordingly changed. The orientation and magnitude of the magnetic vector $M_{CAR}$ relative to the vehicle remain generally constant. Due to the change of orientation of the vehicle 10, the magnetic vector V also changes, as illustrated by the change in magnitude and orientation of V in FIG. 11B. The magnetic field vector V may be normalized, and a calibrated vector V' is generated as described above. Note the corrected vectors V' in the figures are ideally equal.

In FIG. 11C, the orientation of the vehicle 10 is further changed from orientation that was illustrated in FIG. 11B. The orientation of the magnetic vector $M_{CAR}$ of the vehicle 10 relative to the magnetic vector $N_{MAG}$ of the Earth's magnetic dipole is accordingly changed, even though the orientation and magnitude of the magnetic vector $M_{CAR}$ relative to the vehicle remain generally constant. As the product of vector $M_{CAR}$ and vector $N_{MAG}$, the magnetic field vector V changed as illustrated by the change in magnitude and orientation of the magnetic field vector V. The magnetic field vector V is normalized by the magnetic calibration module $V_{CAL}$ 909 and a calibrated vector V' is generated.

FIG. 12 illustrates a calibration module for calibrating sensed magnetic field values, in accordance with some embodiments of the present invention. A magnetic calibration module ($V_{CAL}$) 909 may execute the normalization process by multiplying the incoming magnetic measurements (expected to be on an ellipsoid) times the translation matrix to form corrected or calibrated measurements (expected to be on a sphere).

Figure 13:
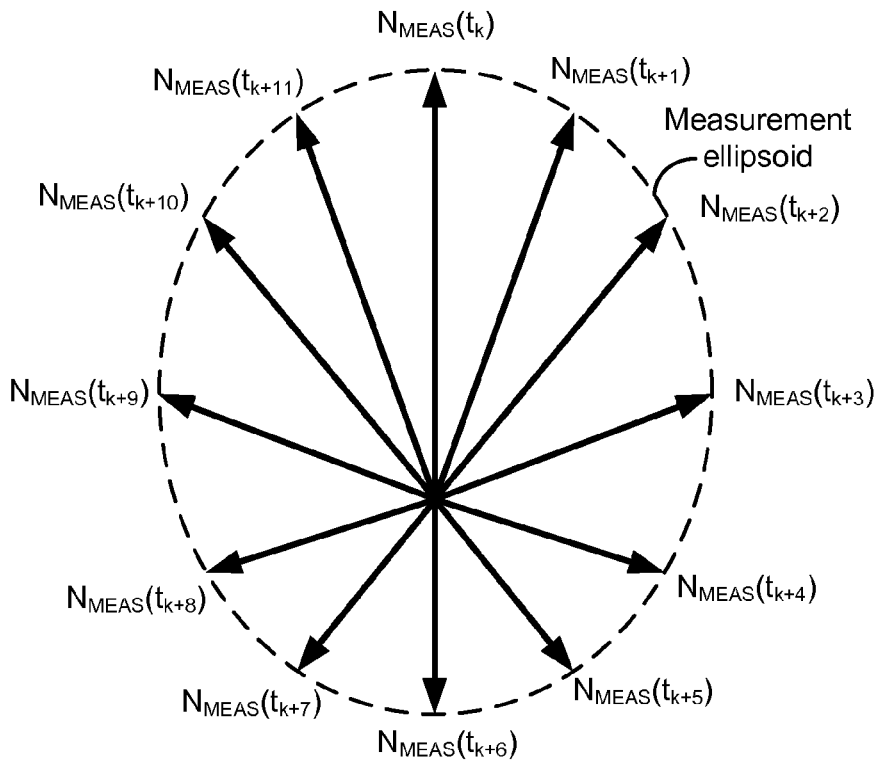
FIG. 13 illustrates a graphical plot of magnetic field vectors defining an ellipsoid, in accordance with some embodiments of the present invention.

FIG. 13 illustrates a graphical plot of magnetic field vectors defining an ellipsoid, in accordance with some embodiments of the present invention. The plot shows magnetic field vectors V for various orientations of the vehicle 10, wherein the magnetic field vectors are taken at a corresponding time $t_{k+N}$ (where N=0, 1, 2, . . . , 11). Each vector illustrates an angular orientation and a magnitude $N_{MEAS}(t_{K+N})$ at a particular time t. As illustrated, the plotted magnetic field vectors may define a 2-D ellipse or a 3-D ellipsoid.

Figure 14:
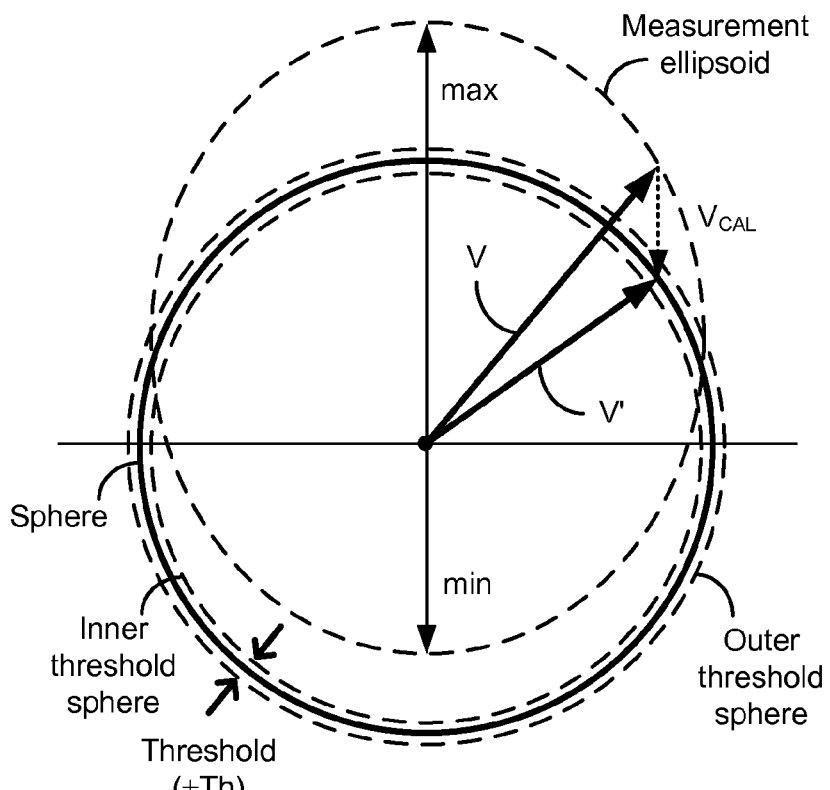
FIG. 14 illustrates graphical plots of magnetic field vectors defining an ellipsoid and calibrated magnetic field vectors defining a sphere, in accordance with some embodiments of the present invention.

FIG. 14 illustrates graphical plots of magnetic field vectors defining an ellipsoid and calibrated magnetic field vectors defining a sphere, in accordance with some embodiments of the present invention. A magnetic sensor measurement is represented by a magnetic field vector V and falls on the ellipsoid. A corresponding calibrated magnetic sensor measurement is represented by the calibrated magnetic field vector V', which falls on the sphere. By passing the measurement through the magnetic calibration module 909, which multiplies it by the translation matrix, V' is produced. Effectively, V'=V−$V_{CAL}$, where $V_{CAL}$ is a calibration vector for correcting measurements at a specific 3-D angle. That is, the vector V, which is one of the vectors that defines the ellipsoid, may be combined with $V_{CAL}$ to produces V', and V' is one the vectors that defines the sphere. Vector $V_{CAL}$ may be a constant or may be a function of the orientation of V. An inner-threshold sphere (with radius Ref−Th) and outer-threshold sphere (with radius Ref+Th) may be defined to determine when the calibration factor $V_{CAL}$ is no longer sufficient for normalizing the magnetic field vector V. Such a condition would occur when the PND 12 has been reoriented and the reference frame 14 of the PND 12 must be recalibrated to realign with the reference frame 16 of the vehicle 10.

Figure 15:
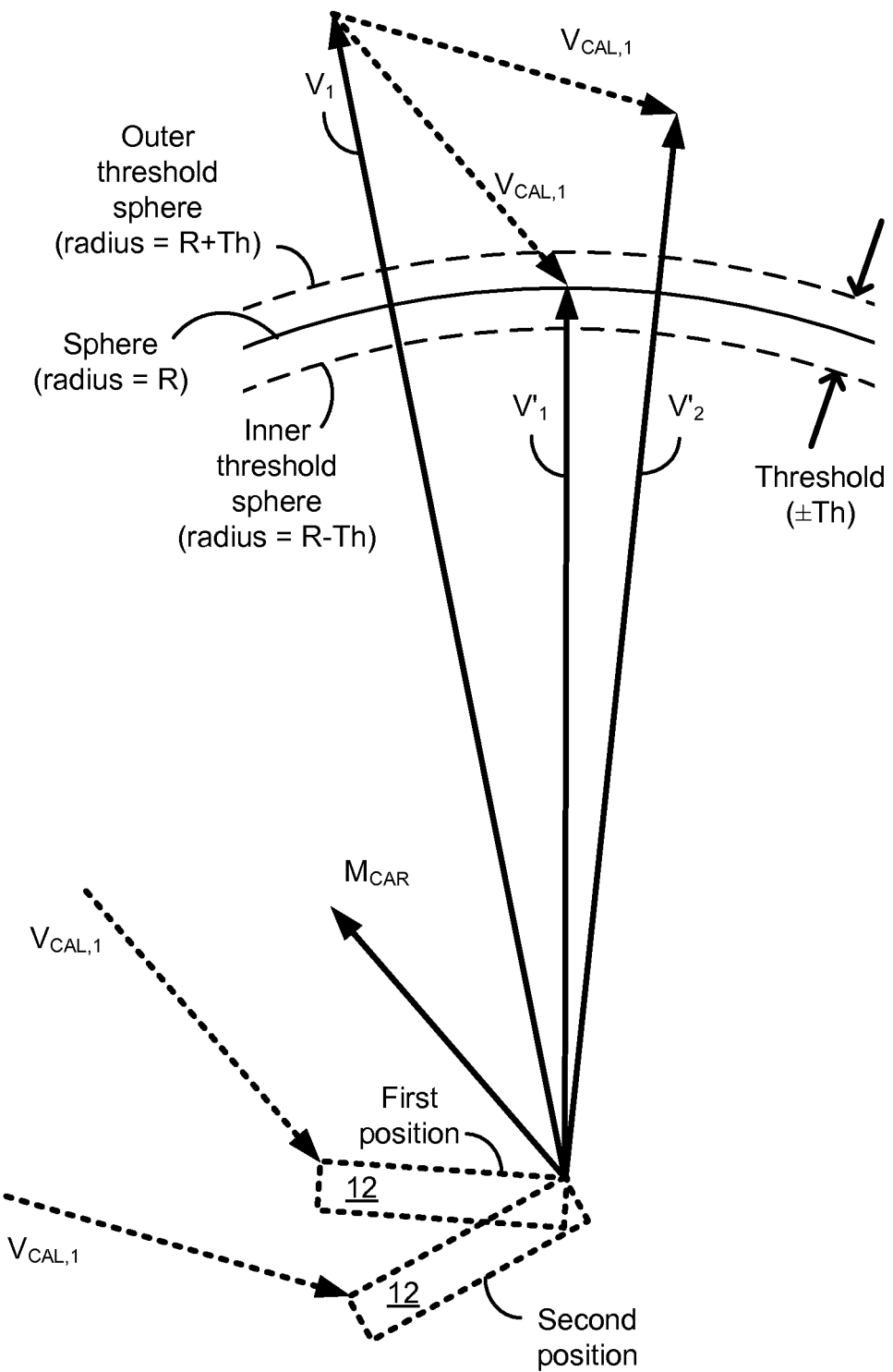
FIG. 15 illustrates details of magnetic field vector V and a calibrated magnetic field vector V', in accordance with some embodiments of the present invention.

FIG. 15 illustrates the details of magnetic field vector V and a calibrated magnetic field vector V', in accordance with some embodiments of the present invention. When the PND 12 is in its first position or first orientation, the detected magnetic field vector $V_1$ may be normalized by the calibration factor $V_{CAL,1}$. The calibrated vector $V'_1$ falls within the inner threshold sphere and the outer threshold sphere, which indicates that the PND 12 is within calibration and reference frame 14 of the PND 12 is aligned with the reference frame 16 of the vehicle 10. The PND 12 is reoriented to a second position. In this second position, the same calibration factor $V_{CAL,1}$ is applied to $V_1$, but in the perspective of the second position of the PND 12. In this example, the calibrated magnetic field vector $V'_2$ does not have the same magnitude as the previously calibrated magnetic field vector $V'_1$. The difference in magnitudes $V'_1$ and $V'_2$ is sufficient enough such that the calibrated magnetic field vector $V'_2$ does not fall within the inner threshold sphere and outer threshold sphere. This example illustrates that reorienting the PND 12 to a second position has caused the PND 12 to be out of calibration. The difference between $V'_1$ and $V'_2$ will trigger an action in the PND 12 to recalibrate before generating navigation output data using inertial data. The triggered action includes computing navigation output data without the inertial sensor measurement since the inertial sensor measurement are most likely out of calibration from the perspective of the reoriented PND 12. Accordingly, the action may include invalidating measurements provided by the inertial sensor for generating navigational guidance information otherwise displayed on the user display 510. The action may also include recalibrating the inertial sensor 504, a dead-reckoning algorithm, and a reference frame conversion matrix for recalibrating the reference frame 14 of the PND 12 to align with the reference frame 16 of the vehicle 10.

Some of the embodiments described above translate three-dimensional magnetic sensor measurements, which typically fall on an ellipsoid, to calibrated magnetic sensor measurements falling on a sphere. That is, measurements are translated from the ellipsoid domain to the spherical domain. When the translation matrix is calibrated with the environment, the calibrated magnetic sensor measurements have a near constant magnitude. When not calibrated, the calibrated magnetic sensor measurements result in a variable magnitude. This embodiment advantageously compares a magnitude of the calibrated magnetic sensor measurements to a constant reference value representing a magnitude of a calibrated sphere. This approach uses a translation matrix to translate measurements from the ellipsoid domain to the spherical domain to fall on a sphere when calibrated. To determine if the calibrated measurements fall on the sphere, a magnitude, which represents a radius, is compared to a reference value, which represents the radius of the reference sphere.

In an alternative embodiment, the three-dimensional magnetic sensor measurements are not translated but analyzed in the ellipsoid domain. In this alternative embodiment, three-dimensional magnetic sensor measurements are directly compared to a reference ellipsoid to determine whether the measurements fall on the ellipsoid (or within a threshold value to the ellipsoid). This alternative approach forgoes complexities of the translation matrix but losses the simplistic magnitude comparison. Instead, the measurements are compared to a three-dimensional ellipsoid model. This approach determines the orientation of the original perturbed magnetic field and applies a reverse conversion (from sphere with constant radius to variable radius on the ellipsoid) and to do the comparison of the measured magnetic vector magnitude to the predicted magnetic vector magnitude in the ellipsoid domain.

In this alternative embodiment, the PND 12 may generate three-dimensional magnetic sensor measurements (e.g., vector V) for initialization, determine a reference ellipsoid from a magnitude of the calibrated magnetic sensor measurements (so it may test future measurements in the ellipsoid domain), generate inertial sensor measurements after this calibration, compare a magnitude of the magnetic sensor measurements to the reference ellipsoid to set a comparison result, and computing navigation output data without the inertial sensor measurements based on the comparison result. That is, after the PND 12 characterizes a reference ellipsoid based on initial magnetic sensor measurements from a 3D sensor, the PND 12 may compare future magnetic sensor measurements to this reference ellipsoid. Once the future magnetic sensor measurements fall more than a threshold distance away from the reference ellipsoid, the PND 12 should halt using inertial sensor measurements in its navigation computations.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. An in-vehicle personal navigation apparatus, the apparatus comprising a personal navigation device (PND), wherein the PND comprises:
    an interface to movably couple the PND to a mount structure comprising a magnet to generate a magnetic field;
    a processor to provide navigation data;
    an inertial sensor coupled to the processor, wherein the inertial sensor generates inertial sensor measurements to the processor; and
    a magnetic sensor coupled to the processor and positioned in the PND to sense the magnetic field from the mount structure, wherein the magnetic sensor provides magnetic sensor measurements to the processor.

2. The apparatus of claim 1, wherein the PND further comprises a satellite navigation system (SPS) receiver coupled to the processor.

3. The apparatus of claim 2, wherein the SPS receiver comprises a global positioning satellite (GPS) receiver.

4. The apparatus of claim 1, further comprising the mount structure comprising the magnet to generate the magnetic field and a complementary interface to connect to the PND.

5. The apparatus of claim 4, wherein the interface of the PND and the complementary interface comprise a connection wherein the PND is detachable from the mount structure.

6. The apparatus of claim 4, wherein the interface of the PND and the complementary interface comprise a connection to provide translational displacement between the PND and the mount structure.

7. The apparatus of claim 4, wherein the interface of the PND and the complementary interface comprise a connection to provide rotational displacement between the PND and the mount structure.

8. The apparatus of claim 4, wherein the interface of the PND and the complementary interface limit an intensity of magnetic flux changes to monotonic magnetic flux changes for reorientations along any cardinal direction.

9. The apparatus of claim 4, wherein the interface of the PND and the complementary interface limit relative movement between a sensitivity axis of the magnetic sensor and a magnetic moment vector of the magnet to be non-intersecting, non-parallel and non-perpendicular.

10. The apparatus of claim 1, wherein the magnetic sensor comprises a single-dimensional magnetic sensor.

11. The apparatus of claim 1, wherein the magnetic sensor comprises a three-dimensional magnetic sensor.

12. The apparatus of claim 1, wherein the magnetic sensor comprises a magnetic flux sensor.

13. The apparatus of claim 1, wherein the magnetic sensor comprises a Hall-Effect detector.

14. The apparatus of claim 1, wherein the PND further comprises a control module coupled to the magnetic sensor, wherein the control module triggers an action in the PND based on a change in the magnetic sensor measurements.

15. The apparatus of claim 14, wherein the action comprises recalibrating of a dead-reckoning algorithm.

16. The apparatus of claim 14, wherein the action comprises invalidating a contribution of the inertial sensor measurements in the navigation data.

17. The apparatus of claim 14, wherein the action comprises triggering a recalibration of the inertial sensor.

18. The apparatus of claim 14, wherein the action comprises recalibrating a reference frame conversion matrix.

19. The apparatus of claim 1, wherein the mount structure is configured to hold the PND device.

20. The apparatus of claim 1, wherein the mount structure in a vehicle is configured to allow a driver of the vehicle to adjust the PND device.

21. The apparatus of claim 1, wherein the interface to movably couple the PND to a mount structure is configured to allow a driver of a vehicle to adjust a position of the PND to obtain a different viewing angle.

22. The apparatus of claim 1, wherein the interface to movably couple the PND to a mount structure is configured to allow the inertial sensor to rotate the inertial sensor to an unknown orientation.

23. The apparatus of claim 1, wherein the interface comprises a surface interface element configured to couple the mount structure to a surface of a vehicle.

24. The apparatus of claim 1, wherein the interface is configured to allow the PND device to be rotated relative to a vehicle.

* * * * *